United States Patent [19]  
McWade et al.

[11] 3,715,741  
[45] Feb. 6, 1973

[54] AIRPORT LIGHTING MONITORING SYSTEM AND SYSTEM COMPONENTS

[75] Inventors: John E. McWade, Media; Jan Keizer, Brookhaven; Wilcy I. Moore, Folsom; Ernest M. Purcell, Swarthmore, all of Pa.

[73] Assignee: Gulf & Western Industrial Products Company, Grand Rapids, Mich.

[22] Filed: Feb. 9, 1971

[21] Appl. No.: 113,821

[52] U.S. Cl. ................340/251, 340/213, 340/223, 340/253, 340/413
[51] Int. Cl. .................G08b 21/00, G08b 26/00
[58] Field of Search....340/248 A, 251, 248, 253, 25, 340/26, 213, 409, 412, 413, 223; 315/120; 307/235; 328/147; 323/6, 2

[56] References Cited

UNITED STATES PATENTS

| | | | |
|---|---|---|---|
| 3,613,092 | 10/1971 | Schumann | 340/223 X |
| 3,543,267 | 11/1970 | Morris | 340/413 |
| 2,941,186 | 6/1960 | Gelli | 340/251 X |
| 3,523,238 | 8/1970 | Jones | 340/251 X |
| 3,609,515 | 9/1971 | Babcock et al. | 323/6 |
| 3,333,183 | 7/1967 | Larrison | 323/21 UX |
| 3,475,750 | 10/1969 | Howell et al. | 340/213 X |
| 3,278,920 | 10/1966 | Sargent et al. | 340/213 |
| 3,566,399 | 2/1971 | Weld | 340/409 |
| 3,516,061 | 6/1970 | Joyaux | 340/413 X |
| 3,252,058 | 5/1966 | Close | 340/248 AUX |
| 3,061,828 | 10/1962 | Hauck | 340/251 |
| 3,054,991 | 9/1962 | Howell | 340/251 |
| 3,531,684 | 9/1970 | Nuckolls | 323/21 X |
| 3,259,835 | 7/1966 | McPherson | 323/25 X |

Primary Examiner—John W. Caldwell  
Assistant Examiner—Scott F. Partridge  
Attorney—Meyer, Tilberry & Body

[57] ABSTRACT

A monitoring system is provided for airport lighting installations employing series connected incandescent lamps. For each lamp there is a fault detector unit with voltage and overcurrent relays supplying an output whenever lamp current or voltage is deficient. There is also a fault detector for supplying an output when output current of a current regulator deviates from the value for which the lamp-current regulator is set.

The lamps are divided into groups and for each group there is a field data acquisition unit. The field data acquisition units in turn, are connected in groups to a master controller with an output to suitable fault-indicating displays to warn of unsafe conditions.

The master controller includes a clock circuit, logic for converting data from the field data acquisition units to form for actuating printers and for actuating accumulative fault display, and a sequencer for enabling data from successive groups of field data acquisition units to be handled by a single master controller. There is a print-out, identifying lamp circuits with faults and the runway in which they occur. For each runway there is an accumulative fault display indicating the number of faults in that runway.

22 Claims, 8 Drawing Figures

PATENTED FEB 6 1973
3,715,741
SHEET 1 OF 5
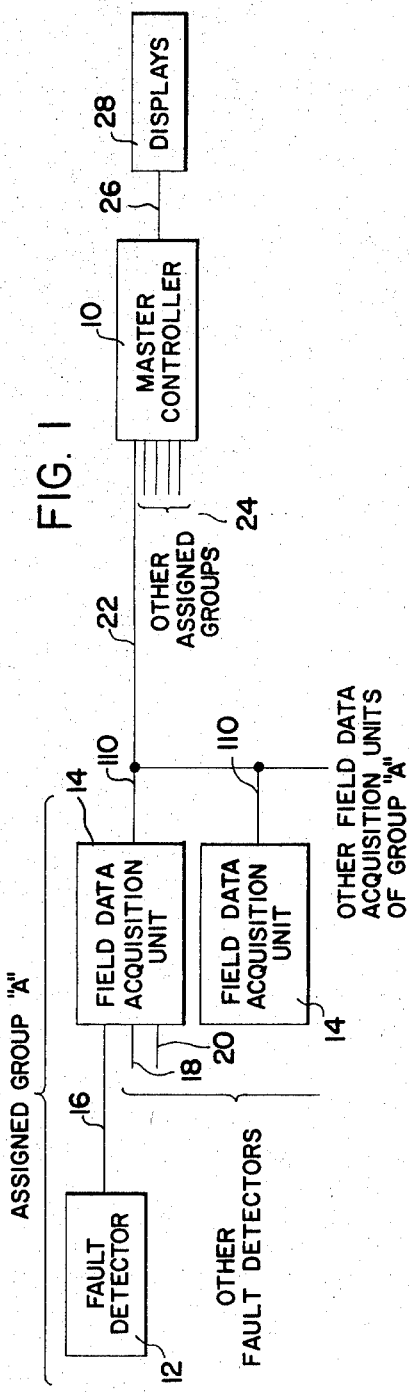
FIG. I
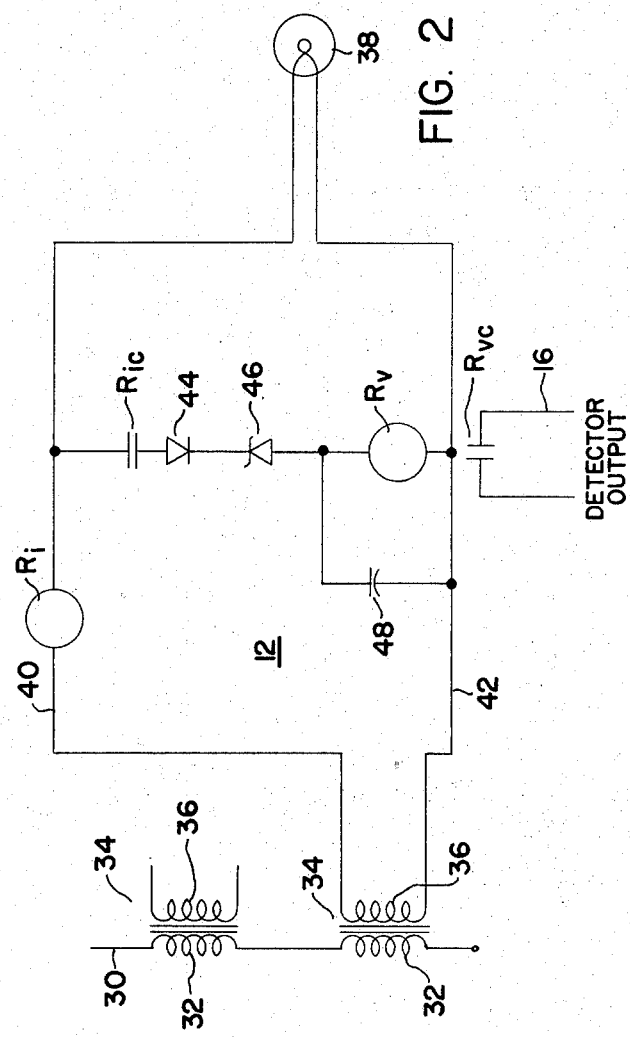
FIG. 2
INVENTORS
JOHN E. McWADE
WILCY L. MOORE
ERNEST N. PURCELL
JAN KEIZER
BY
*Meyer, Tilberry & Body*
ATTORNEYS

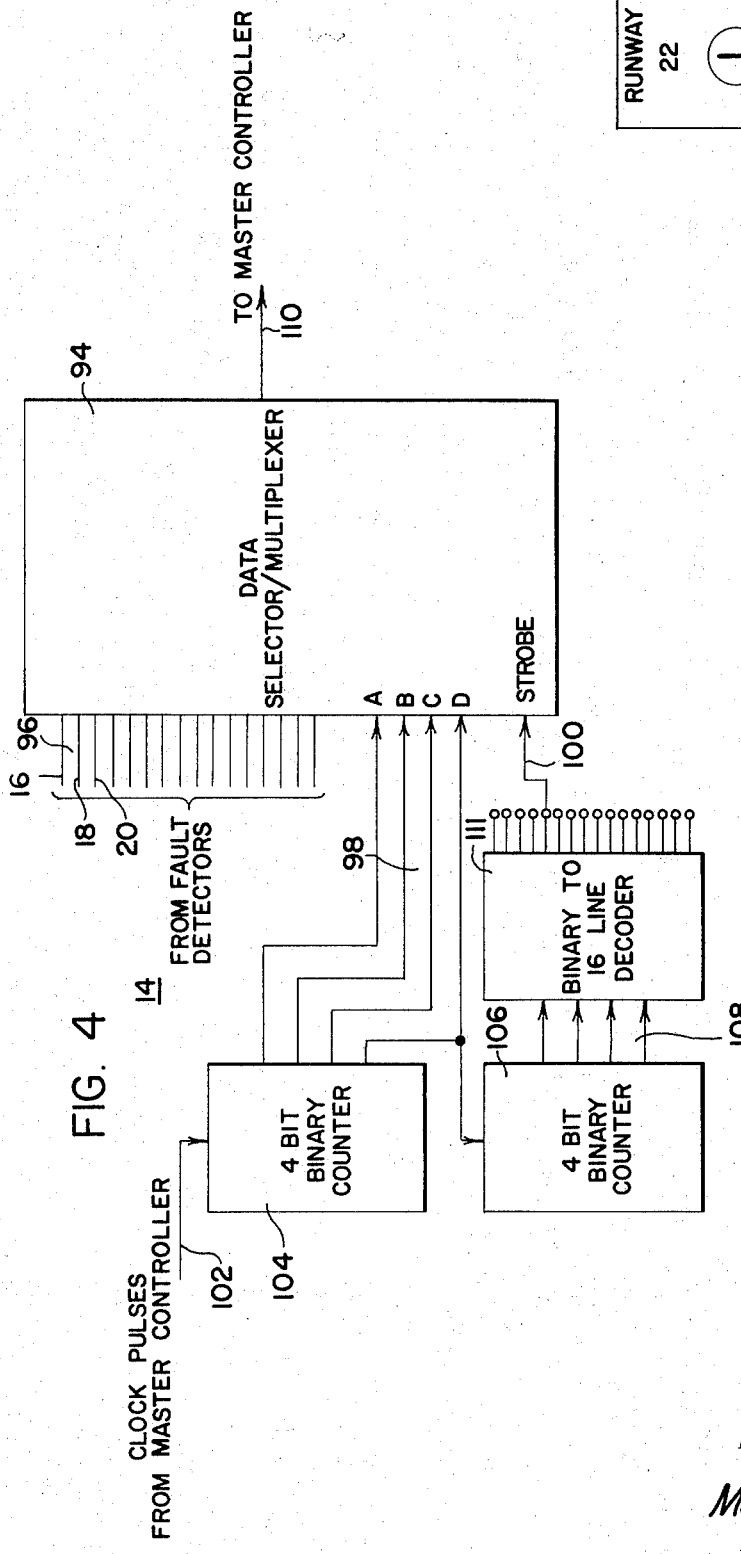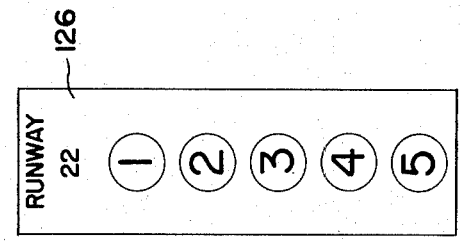

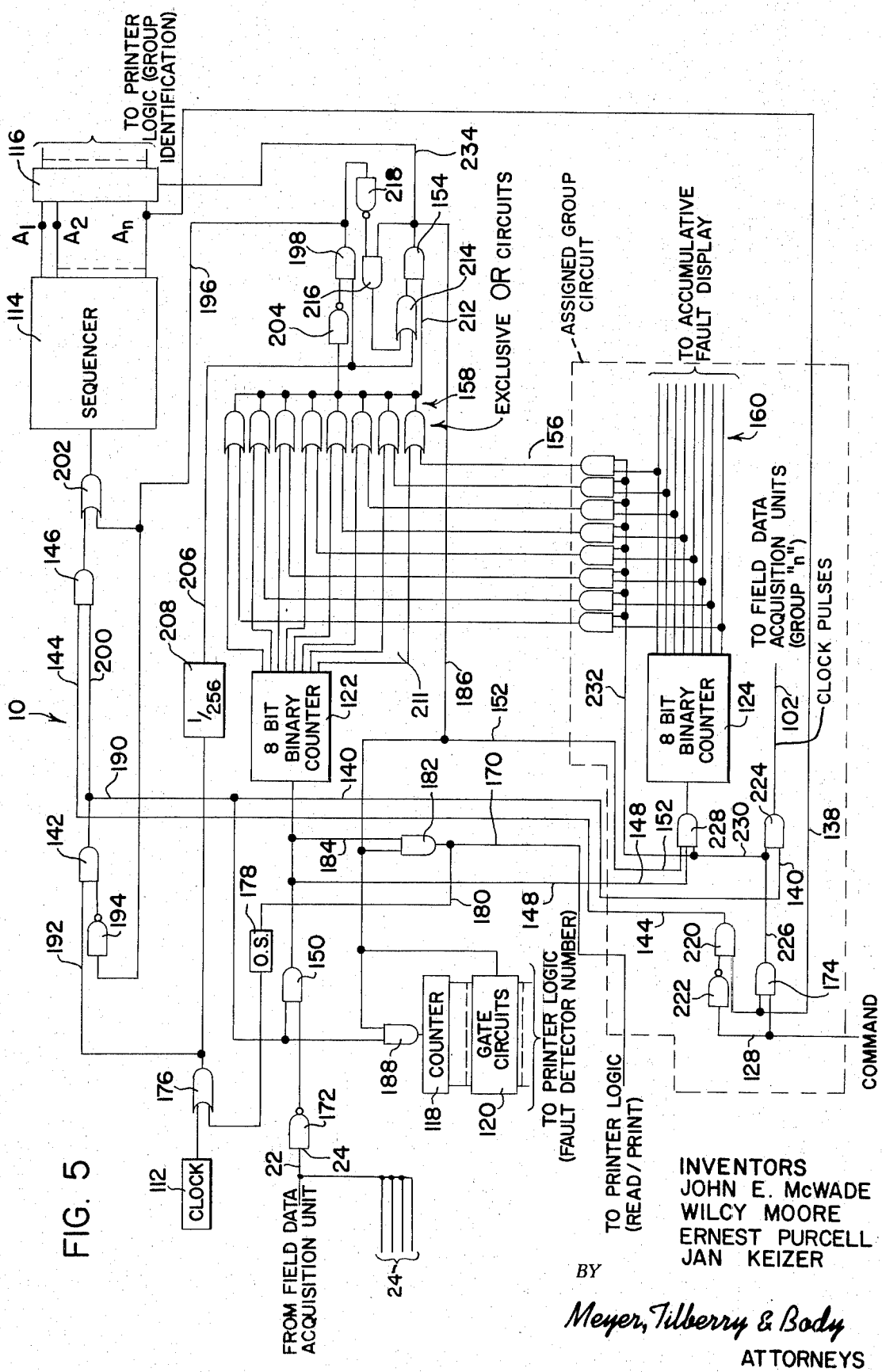

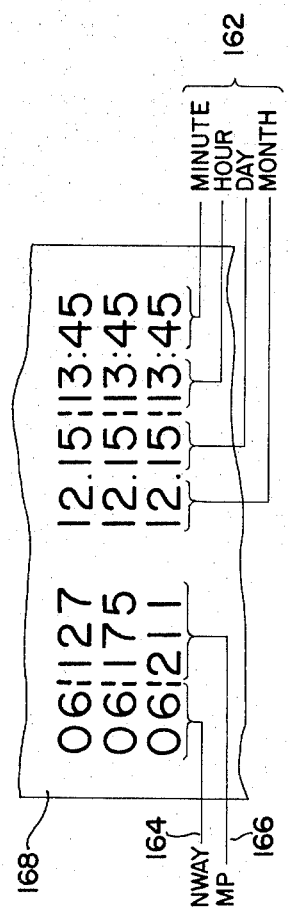
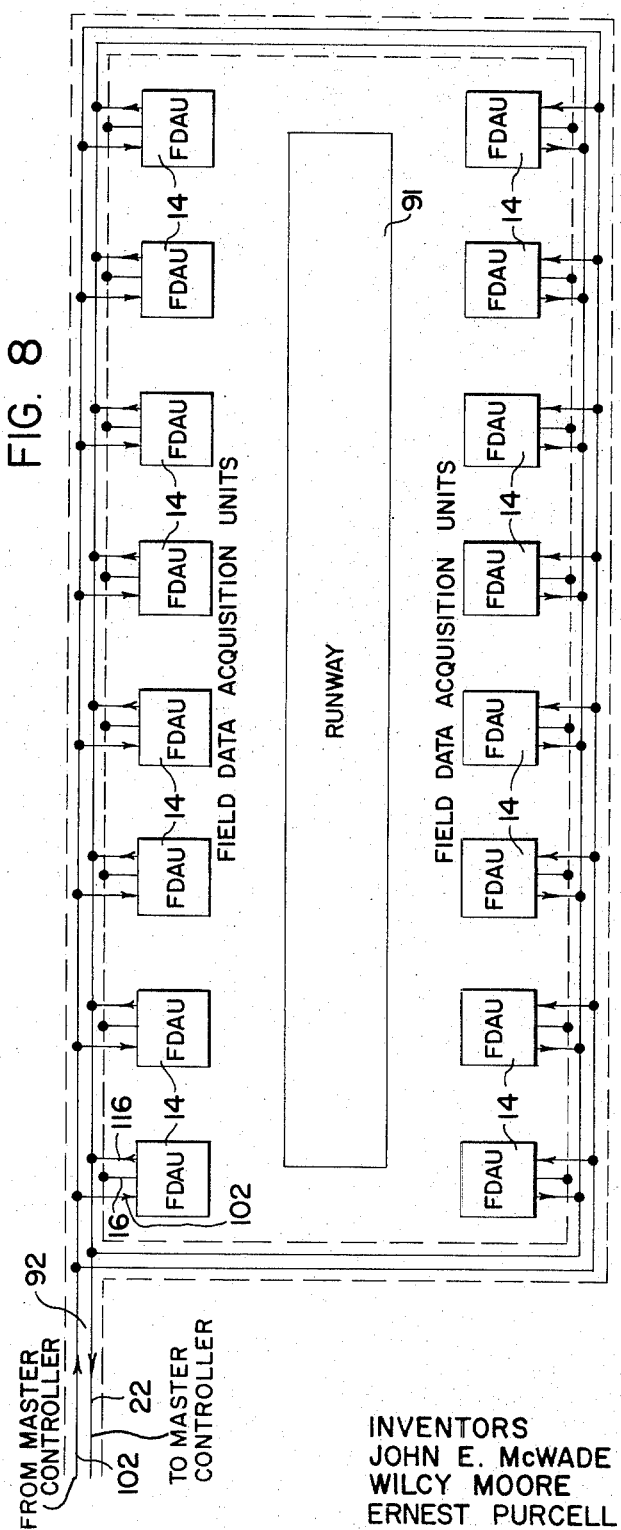

AIRPORT LIGHTING MONITORING SYSTEM AND SYSTEM COMPONENTS

It is desirable for airports to have lighting monitoring systems to monitor the airport runway lighting circuits continuously in order that the operator in the control tower or the control office can be assured that the lighting conditions are safe in any runway to which aircraft are directed.

An object of the invention is to provide an airport lighting monitoring system which will give number, identification and time information to a remote station on any monitored circuit fault.

A more specific object of the invention is to provide a monitoring system which shall detect shorted or open conditions in monitored lamp circuits, which shall detect improper current outputs of monitored current regulators, which shall be capable of continuously scanning all fault detectors, which shall provide a fault indication very quickly after fault occurrence, for example, within 75 seconds, which shall provide gross fault information of faults per runway, to inform tower cab personnel whether the particular runway is operable for a predetermined or prescribed standard of safety.

A further object of the invention is to provide a system which shall be adaptable to operation with any switch-closure sensor.

In carrying out the invention in accordance with a preferred form thereof, fault detectors are provided adjacent the lamp circuits and field data acquisition units are also provided on the field adjacent the runways. In the tower cab or control office, a master controller and displays are provided and there is intersystem cabling.

In the illustrative system described the monitoring system is adapted for a series lamp connection in which a current transformer is provided for each lamp with the primary windings of the current transformer connected in series to a constant current power supply. Each lamp fault detector is connected between the current transformer and the lighting fixture, and preferably, near the current transformer. The detector is of a type which produces a contact opening upon sensing a fault.

Failure in the lamp circuit either due to a short or open circuit results in opening of the output contacts.

Each lamp fault detector consists of a circuit between the isolation transformer secondary windings terminals and the lighting fixture terminals with a current relay winding in series therewith and a shunt circuit across the transformer terminals and the lighting fixture terminals including a normally open contact of the current relay, a rectifier, a zener diode and the winding of a voltage relay in series. The voltage relay winding is shunted by a capacitor. The voltage relay is a normally open contactor with the normally open contacts in series with the input of the field data acquisition unit.

A current-level fault detector is provided which is of the differential or comparator type. It includes a current transformer with a primary winding in series with the circuit providing the actual current to the lighting circuit and a secondary winding connected to a rectifier, the output of which serves as one of the inputs to a differential amplifier. For comparison, a voltage divider is provided consisting of series resistors with common terminals, each having normally open relay contacts connected between the common terminal and a second input terminal of the differential amplifier. Each of the relay contacts has a winding connected in parallel with one of the control circuits of a current regulator step-control so that the relay contact closed represents the actual condition of the step controls of the current regulator. Accordingly, the voltage output of the voltage divider represents the setting of the current regulator. This enables the differential amplifier to compare the control setting with the actual current flow. If there is any fault in the current regulator, an unbalance occurs in the input to the differential amplifier which is supplied to the winding of a relay having normally closed contacts connected in the current-level fault detector output circuit.

Each field data acquisition unit comprises a conventional data selector/multiplexor having an output to the master controller and inputs from each of the fault detectors as well as inputs from lines indicating the specific runway lamp to be monitored in a particular lamp group and an input from a strobe line. The group lines indicating the specific runway lamp to be monitored are outputs from the binary counter which is clocked by clock pulses from a master controller. The strobe line is energized by the output from a second binary counter through a binary to sixteen line decoder, assuming 16 lamps in each group, with the second binary counter being clocked from the last stage output of the first binary counter.

The master controller is provided with a clock input, a counter for activating gate circuits to printer logic to indicate the number of a lamp circuit in which a fault occurs, a counter with logic for lamp group identification by the printer, a sequencer for supplying information from the field data acquisition unit to identification circuits for successive lamp groups in succession, and a counter with associated logic for supplying information to an accumulative fault display.

The printer is arranged to print out digits identifying the runway, the lamp circuit for the runway and the time at which each lamp circuit fault occurs. There is an accumulative fault display for each runway, identifying the runway and indicating the number of faults detected on the runway.

A better understanding of the invention will be afforded by the following detailed description considered in conjunction with the accompanying drawing in which:

DRAWINGS

FIG. 1 is a system block diagram representing in fragmentary form the components of a system which may be employed for monitoring more than one group of runway lamps, FIG. 2 is a circuit diagram of the lamp fault detector employed in the system of FIG. 1, FIG. 3 is a circuit diagram, partially in block form, of a current-level fault detector for use in the system of FIG. 1, FIG. 4 is a block diagram illustrating the components and interconnections of a field data acquisition unit, FIG. 5 is a circuit diagram, partially in block form, illustrating the components and interconnections of a master controller for use in the system of FIG. 1 and connections to components represented in FIGS. 2 to 4 inclusive, FIG. 6 is a diagram of a print-out which may be obtained by the system described, FIG. 7 is a diagram representing one of the accumulative fault displays for one of the runways monitored by the system, and FIG. 8 is a diagram of the field cabling for one of the runways illustrating the location of field data acquisition units on the field adjacent the runway.

Like reference characters are utilized throughout the drawings to designate like parts.

DETAILED DESCRIPTION

Figure 3:
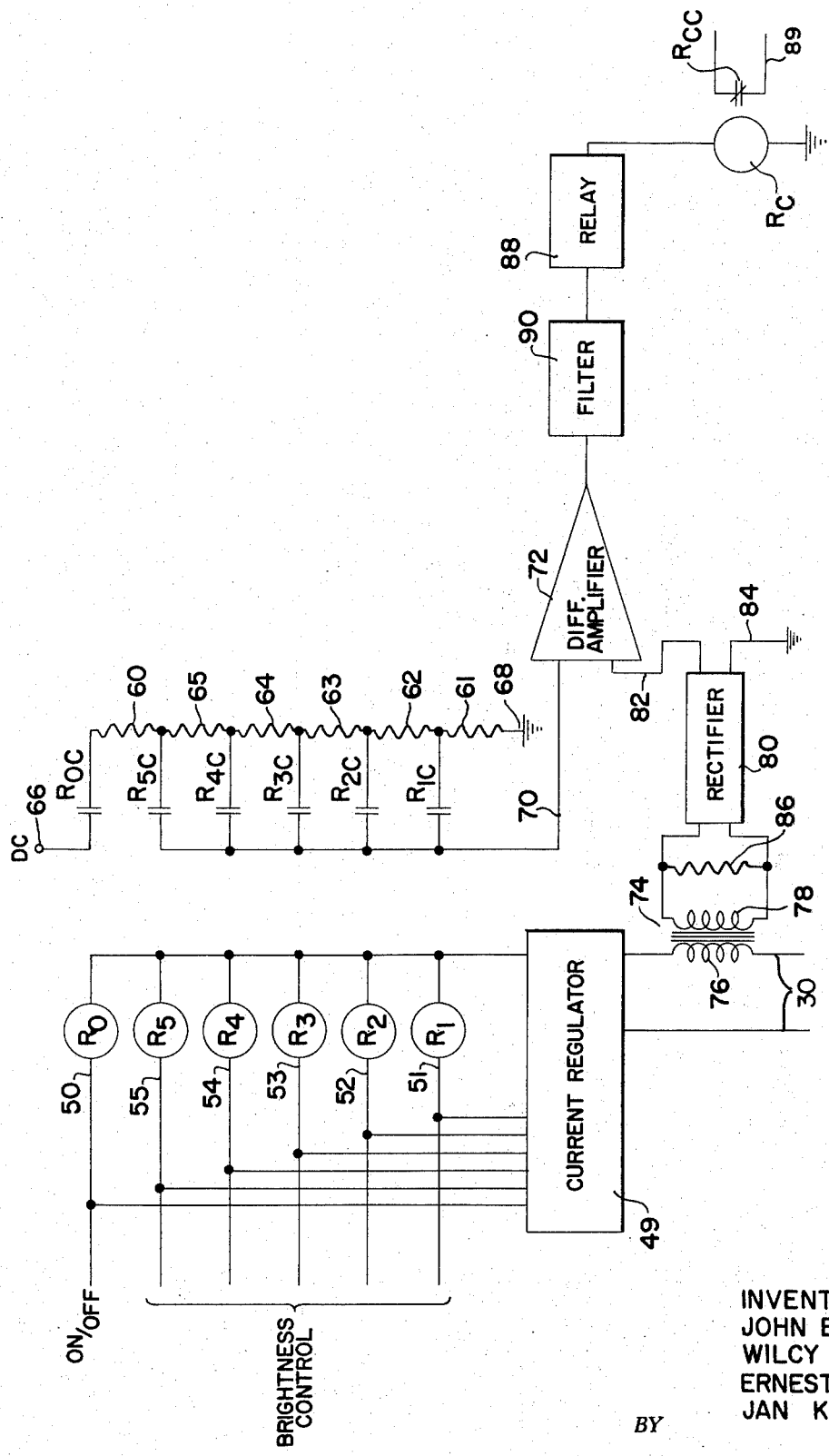

In airport runway lighting system s where a considerable number of lamps are employed, the lamps are divided into groups, each with a fault detection circuit leading to a master controller. For each group, fault detection equipment is provided. For example, as illustrated in FIG. 1 of the drawings, there is a master controller 10. For one of the groups of lamps designated on the drawing — Assigned Group "A" — there is a plurality of fault detectors 12, only one of which is represented. There is a plurality of field data acquisition units 14 having a plurality of input lines, one of which, line 16 interconnects the fault detector 12 and the field data acquisition unit 14. Additional input lines, only two of which line 18 and line 20 are shown, are provided for supplying the field data acquisition unit with input from additional fault detectors.

Additional field data acquisition units likewise have input lines not shown from additional fault detectors. All of the field data acquisition units of assigned group "A" have a common output over a line 22 to the master controller 10. Other assigned groups corresponding to assigned group "A" have input lines represented collectively as lines 24 to the same master controller 10. The master controller 10 has a plurality of output lines 26 to displays 28 and also to print-out mechanism not separately illustrated in FIG. 1.

There are two types of fault detectors, one is for the purpose of detecting faults in a lamp circuit on a runway and the other is for detecting a fault in the current level of the input to the lamp. The lamp fault detectors are illustrated in FIG. 2. There is a separate such detector for each lamp. A series type of lamp connection may be utilized in order that a plurality of lamps may have their current level set together. As illustrated in FIG. 2, there is a constant-current power supply line 30 supplying in series primary windings 32 of current transformers 34, each of which has a secondary winding 36 connected to a separate runway lamp 38. The lighting system is thus a constant current system rather than a constant voltage system. The transformers 34 have saturable cores in the conventional apparatus so that an open secondary winding resulting from a burntout or disconnected lamp or otherwise, will not be reflected in the primary circuit, so as to interrupt the flow of current to other lamps.

Conductors 40 and 42 are connected to the terminals of the isolation transformer secondary 36 and also to the terminals of the lighting fixture in which the lamp 38 is mounted. A current relay is provided having a winding $R_i$ in series with the line 40. The relay $R_i$ has normally open contacts $R_{ic}$. A voltage circuit is connected between lines 40 and 42 including the current relay contacts $R_{ic}$, a rectifier 44, a zener diode 46, and the winding of a voltage relay $R_v$. The diodes 44 and 46 are so connected that when current is flowing in the forward direction through the diode 44, the back voltage for which the zener diode 46 is designed occurs across its terminals so that current flows through the voltage relay winding $R_v$ only when voltage between the the lines 40 and 42 exceeds the value for which the zener diode 46 is designed. The voltage relay $R_v$ has normally open contacts $R_{vc}$. A capacitor 48 is connected across the winding of the voltage relay $R_v$.

The current-level fault detector illustrated in FIG. 3 is designed for use with a conventional current regulator 49 of the step type. In this type of current regulator, there is a plurality of conductors 51 and 55 inclusive having connections to switches or contactors (not shown) for selecting different current levels for use in the high voltage series lighting circuit 30. There is also a line 50 which is de-energized so that no current flows through the high voltage lighting circuit 30 when it is desired to shut off the lamps on the runways. In accordance with the invention, relays $R_1$, $R_2$, $R_3$, $R_4$, $R_5$ and $R_0$ are provided, having windings in series with the conductors 51, 52, 53, 54, 55 and 50, respectively. In normal operation of such a conventional current regulator no current flows in the line 30 until the line 50 is energized. For maximum current setting of the lighting circuit 30, line 55 is energized. For the minimum current setting line 51 is energized. Energization of lines 52, 53 or 54 results in intermediate levels of current in the high voltage lighting circuit 30. Each of the windings of the relays $R_1$, $R_2$, $R_3$, $R_4$, $R_5$ and $R_0$ has a corresponding pair of normally open contacts $R_{1c}$, $R_{2c}$, $R_{3c}$, $R_{4c}$, $R_{5c}$ and $R_{0c}$, respectively.

A current regulator setting indicator is provided comprising resistors 61, 62, 63, 64, 65 and 60 connected in series in and indicator-voltage, direct-current circuit having a positive terminal 66 and a ground terminal 68. Each of the junction terminals of the series connected resistors is connected to one of a pair of normally open relay contacts $R_{1c}$, $R_{2c}$, $R_{3c}$, $R_{4c}$ and $R_{5c}$, the other contact of which is connected to a line 70 forming one of the input lines of a differential amplifier 72. However, the relay contacts $R_{0c}$ are connected between the direct-current power supply terminal 66 and the resistor 60 in a series circuit therewith.

The direct-current indicator circuit supplied by the source having a terminal 66 is arranged as shown to supply successively higher indicator voltages to the line 70 as the regulator 49 is set for successively higher current values. Thus, when the system is turned off, the relay contacts $R_{0c}$ are open and no voltage is applied to the line 70. When only relay contacts $R_{0c}$ and $R_{1c}$ are closed, the minimum voltage is applied to the line 70. With higher current settings for the current regulator 49, higher voltages are applied to the line 70 as a result of different relay contacts $R_{2c}$, $R_{3c}$, $R_{4c}$, $R_{5c}$, respectively, being closed.

For checking actual current flow with the setting of the current regulator 49 a voltage comparison circuit is provided. The voltage at the line 70 represents the setting of the current regulator 49 or the magnitude of current which should be supplied or flowing in the high voltage lighting circuit 30. To produce a comparison voltage representing actual current, a standard current transformer 74 is provided having a primary winding 76 in series with the lighting circuit and a secondary winding 78 connected to a full-wave rectifier 80 having a first output line 82 connected as the second input line to the differential amplifier 72 and having a second output line 84, which is grounded. Consequently, a voltage appears on the line 82 which represents the magnitude of the actual current flowing through the current transformer primary winding 76 and the high voltage lighting circuit 30. In order to guard against the current transformer 74 presenting an excessive impedance in the lighting circuit 30, a resistor 86 of relatively small resistance is connected across the secondary winding 78.

A detector output relay $R_c$ is provided having a winding supplied by the output of the differential amplifier 72 and having normally closed contacts $R_{cc}$ connected in the detector output circuit 89. Since the circuits are designed for relatively small current outputs from the differential amplifier 72, a relay driver or current amplifier 88 is provided between the output of the differential amplifier 72 and the winding of the relay $R_c$. Preferably, also a filter 90 is interposed in the differential amplifier output circuit. The voltage supplied to the line 70 may be referred to as a command voltage, since it represents the command given to the current regulator 49 and the relay $R_c$ is thus the current regulator fault relay. The filter 90 serves to smooth out variations in the output of the differential amplifier when the adjustment of the current regulator 49 is changed from one step to another, thereby avoiding transients in the circuit of the winding of the current regulator fault relay $R_c$ and chattering of the contacts $R_{cc}$.

As shown in FIG. 8, field data acquisition units 14 are mounted on the field along the runway 91. In the specific embodiment illustrated, there are 16 field data acquisition units for each runway with cabling 92 connecting the field data acquisition units to the master controller 10 shown in FIG. 1. Each of the field data acquisition units has connected thereto a plurality of fault detectors as explained in connection with FIG. 1. For example, in the specific embodiment illustrated, there may be 16 fault detectors for each field data acquisition unit.

As illustrated in FIG. 4, each field data acquisition unit comprises a data selector/multiplexer 94 with an output to the master controller 10 and a plurality of fault detector input lines 96, shown as 16 in number in the particular embodiment illustrated and described, detector selection input lines 98, and field data acquisition strobe line 100. The field data acquisition unit is provided also with an input line 102 for receiving clock pulses from the master controller 10. For sequencing the data from the assigned group "A", two four-bit binary counters 104 and 106 are provided. Counter 104 has an input from the clock pulse line 102 and an output line 92 to terminals A, B, C, D of the data/multiplexer 94. Counter 104 sequences the fault detector sub-group in assigned group "A". Counter 106 sequences the field data acquisition unit in assigned group "A". Counter 106 has an input line from the most significant bit of counter 104 and outputs 108 to a binary to 16-line decoder 111. the output lines 100 of which serve as the strobe input lines for the data selector/multiplexor 94. The data selector/multiplexor is of conventional type and therefore need not be described or illustrated in detail in the present application.

The master controller employed in the embodiment illustrated, as shown in FIG. 5, has input lines 22 and 24 from groups of field data acquisition units such as illustrated in FIG. 1. The output lines 110 of field data acquisition units 14 of any assigned group are connected together, as shown in FIG. 1.

The master controller comprises a digital clock 112, a sequencer 114, gate circuits 116 for conventional printer logic for printing out group identification, and various counters and logic elements. As shown, there is a counter 118 supplying gate circuits 120, for conventional printer logic for printing out fault detector numbers and a pair of eight-bit binary counters 122 and 124. The eight-bit binary counters 122 are interposed in a logic circuit for selecting the data from field data acquisition units to be supplied to the printer-logic gate circuits 116. The eight-bit binary counter 124 serves to actuate accumulative fault displays 126 (shown in FIG. 7).

In FIG. 5 of the drawings, master controller circuitry for only one assigned group or runway is illustrated in order to avoid needless repetition. For each such assigned group or runway the circuitry includes the eight-bit binary counter 124, a command input line 128 connected to switches or circuitry in the control tower (not shown), a line 138 connected to one of the group identification output lines A, $A_1$, $A_n$ and so forth of sequencer 114, a line 140 connected to the output of an AND gate 142, a line 144 forming one of the inputs of an AND gate 146, a line 148 connected to the output of an AND gate 150, a line 152 connected to the output of an AND gate 154, a group of lines 156-1 to 156-8 from AND gates respectively, each to one of the inputs of a group of exclusive OR gates 158 and a group of lines 160 connected to the input of an accumulative fault display 126 for the runway in question.

In the assigned group circuits of the master controller there is an AND gate 220 having one input from the line 138 and a second input from the command line 128 through an inverter 222. Command line 128, for the assigned group, originates in the control tower and provides a signal to permit the master controller to determine whether or not a group of lamps is supposed to be energized. The AND gate 174 also has inputs from the command line 128 into group identification and sequencer-synchronizing line 138.

There is an AND gate 224 having inputs from the line 140 and from the output of the AND gate 174 through a line 226. The field data acquisition units 14 receive their clock pulses from a master controller 10 through the output line 102 from the AND gate 224.

There is a three-input AND gate 228. In addition to the input through the lines 148 and 152 it has an input from the output of the AND gate 174 through lines 226 and 230. Each of the AND gates of the group 156 also have an input from the lines 226, 230 and 232 in addition to inputs, respectively, from the successive output lines of the group 160 from the eight-bit binary counter 124.

A conventional rotating dial printer may be employed for producing a decimal digital print-out such as illustrated in FIG. 6. Such a printer may have conventional rotating wheels rotated by a conventional 24-hour time clock mechanism to rotate time-indicating printer wheels serving to specify time in decimal digits 162 representing minute, hour, day and month. There are also wheels adapted to be actuated by magnetic coils, selectors, or other suitable mechanism, for positioning digits 164 identifying the runway and similar means for positioning digits 166 identifying the lamp circuit.

There is also a suitable mechanism in such time switches for actuating the printer to press the type wheels against a chart or paper strip 168 or the like when energized. Line 170 from the master controller of FIG. 5 is provided for energizing or actuating such print-out mechanism. A printer logic, not shown, controlled by gates 116, is provided for energizing the mechanism for setting the runway identification wheels 164 and a printer logic controlled by the gate circuits 120 is provided for energizing the mechanism setting the lamp-circuit identifying wheels 166.

The field data acquisition output lines 22 and 24 are connected to the master controller as input to an inverter 172.

Referring to the upper portion of FIG. 5, there is an OR gate 176 having an input from the clock 112 and a second input from an astable or one-shot multivibrator 178. The one-shot multivibrator 178 has an input line 180 from the output of an AND gate 182. The AND gate 182 in turn has an input through a line 184 from the output of the AND gate 150 and a second input over line 186 from the output of the AND gate 154.

There is an AND gate 188 having an output to the counter 118 and having one input over line 190 from the output of the AND gate 142 and a second input from the line 186 from the output of the AND gate 154. The AND gate 142 has an input over line 192 from the output of the OR gate 176 and a second input from an inverter 194 and a line 196 from the output of an AND gate 198. In addition to the input from the line 144, the AND gate 146 also has an input through a line 200 from the output of the AND gate 142. The input to the sequencer 114 is from an OR gate 202 having one input from the output of the AND gate 146 and another input from the line 196 from the output of the AND gate 198.

The AND gate 198 has one input through an inverter 204 from the common output of the exclusive OR circuits 158 and a second input through a line 206 from the output of the OR gate 176 with a frequency divider 208 interposed. In the embodiment illustrated, the frequency divider 208 is arranged to divide the clock pulses received from the clock 112 by 256.

Each of the exclusive OR circuits in the group 158 has in addition to the input from the AND gates 156, an input from one of the output lines 211 of the eight-bit binary counter 122. The input to the counter 118 is from the AND gate 188.

The AND gate 154 also has an input through the line 212 from the common output of the exclusive OR circuits 158 and a second input from the output of the OR gate 214. The latter has an input from the line 206 and a second input from the output of an AND gate 216. The AND gate 216, in turn, has inputs from the output of the AND gate 154 through a line 186 and from the output of the AND gate 198 through an inverter 218.

Suitable mechanism is provided in the data selector/multiplexer 94 (FIG. 4) so that an open fault detector output line 16 results in an input signals within the data selector/multiplexer 94. Likewise, the arrangement is such that the opening of the current-level fault detector output line 89 results in the application of another input signal in the data selector/multiplexer 94.

OPERATION

When a lamp circuit is energized and there is no fault in it, that is, no short circuit and no open circuit, the voltage relay $R_v$ is energized and the contacts $R_{vc}$ are closed. But when a fault occurs, the relay $R_v$ is de-energized and the contacts $R_{vc}$ open. During normal operating conditions, current flow through the series power supply line 30 and the primary winding 32 of the isolation transformer 34 producing a current in the secondary winding 36 which flows through the current relay $R_i$ and the lamp 38. The flow of current through the current relay winding causes the contacts $R_{ic}$ to close forming a shunt circuit from the conductor 40 through the relay winding $R_i$, the contacts $R_{ic}$, the rectifier 44, the zener diode 46 and the voltage relay winding $R_v$ back to the conductor 42. This causes the normally open relay contacts $R_{vc}$ to close. However, if an open lamp circuit occurs, the special construction of current transformer 34 does not permit sufficient current to relay winding $R_i$ to keep relay contacts $R_{ic}$ closed, thus, de-energizing relay winding $R_v$ and permitting relay contacts $R_{vc}$ to open. In case of a short circuit of the terminals of the lamp 38, current may flow through the current relay winding $R_i$ but the voltage between the conductors 40 and 42 falls to a value below the constant voltage for which the zener diode 46 is designed, no current can flow through the voltage relay $R_v$ and the detector output contacts $R_{vc}$ remain open as in the case of an open circuit fault. If there is a short circuit at the terminals of the secondary winding 36 of the isolation transformer 34 or anywhere else between the conductors 40 and 42 adjoining the isolation transformer secondary winding and the lamp 38, there is likewise no voltage between the conductors 40 and 42 or across the voltage relay winding $R_v$ and the voltage relay contacts $R_{vc}$ remain open.

Referring to FIG. 3, if the current regulator 49 does not respond properly to its brightness control input, the current flow in the series power circuit 30 will not correspond to the setting of the current regulator as indicated by the voltage at the pertinent junction terminal of the resistors 61 to 65, which is applied to the input terminal 70 of the differential amplifier 72. Consequently, there will be a difference between the voltages at the lines 70 and 82, an output will be received from the differential amplifier 72 which will be filtered by the filter 90, amplified by the relay driver 88 and applied to the relay winding $R_c$. This will cause the normally closed contacts $R_{cc}$ to open, resulting in a signal through line 89 to the data selector/multiplexer 94.

For synchronization the clock 112 produces timed pulses which are applied through the gates 176, 142, 146 and 202 to sequencer 114 provided the other inputs to the AND gates 142 and 146 are of the proper polarity. Since the gates 176 and 202 are OR gates, the clock pulses will pass through these gates regardless of the polarity of the other input. If there is a signal in any of the output lines of the eight-bit binary counter 122 but not on any of the lines 156 to the inputs of the exclusive OR circuits 158, there will be an output from the exclusive OR circuits. However, it is inverted by the inverter 204 so that the AND gate 198 does not close. However, if there is no output from the eight-bit binary counter 122 or outputs occur from both the eight-bit binary counter 122 and the eight-bit binary counter 124 as well as the gate 174, there will be a signal into the AND gate 198 through the inverter 204. There will also be a second signal into the gate 198 through the AND gate 176 and line 206 once for every 156 pulses from the clock 112 as a result of the frequency divider 208 interposed in line 206. Consequently, under these conditions the sequencer receives an impulse once for each 256 clock pulses.

With each actuation of the sequencer 114 a different output line is enabled and a different gate circuit from the gates 116 is applied to the printer logic group identification. Accordingly, if a fault signal is applied to the line 22 and the inverter 172 to the AND gate 150 at an instant corresponding to a clock pulse which serves to synchronize the operation of the printer logic group coupled to the gates 116, such a fault signal is applied through the eight-bit binary counter 122, the exclusive OR gates 158, the AND gate 154 and an output line 234 from the AND gate 154 to close the enabled gate in the gate circuits 116 to actuate the group identification wheels of the printer. The AND gate 154 under the circumstances described will also have a second input so that an output occurs through the line 234 as described. The second output is from the OR gate 214 which has received an input signal from the line 206 through the frequency divider 208 and the AND gate 176.

At the same time, a fault signal traveling through the AND gate 150, the eight-bit binary counter 122, the exclusive OR circuits 158, the AND gate 154 and the line 186 will also be applied to the AND gate 188 and through a gate closing line 236 to the gate circuits 120 for the fault detector number printer logic, since the AND gate 188 also has an input through the line 190 at the time the clock pulse is received as previously described. Accordingly, the appropriate lighting circuit identification printing wheel in the group 166 for the print-out of FIG. 6 is turned to the proper position.

In the event of a fault in the lighting circuit, the fault signal is applied through the AND gates 150 and 182 to the line 170 for actuating the printer, provided the printing wheels are then in the position corresponding to the lighting circuit in the group in which the fault occurs. Otherwise, the line 170 is not energized until the sequencer 114 has brought the group identification printer wheel to the position corresponding to the group in which the defective lighting circuit exists and the counters 122 and 118 have brought the fault detector identification wheel to the position for identifying a lighting circuit in which the fault exists. Thereupon, the line 170 is actuated and the print-out of FIG. 6 occurs, identifying the lamp and the runway in which the fault occurs and the time at which the print-out is made. In a similar manner fault signals from the current-level fault detector of FIG. 3 produce identification of the runway having defective regulation by means of setting of runway identification digits 164. Subsequent examination of the print-out sheet 168 enables operating personnel or inspectors to determine during what period of time a particular lamp circuit was not operating or a regulator was not operating properly. Moreover, examination of the print-out 168 as it is being made also enables personnel of the airfield to issue instructions for the rectification of the fault.

Each time a fault signal is received through the line 22 when the sequencer 114 and the eight-bit binary counter 124 are in a position for a given group or runway, a signal is applied also from the AND gate 150 through line 148 to the AND gate 228 to apply a signal through the AND gate 228 and the eight-bit binary counter 124 for indexing the accumulative fault display 126 to illuminate lamp number 1 of the display 126 of FIG. 7 or to advance the indication to a subsequent number 2, 3, 4 or 5, depending on the previous setting of the accumulative fault display, provided the AND gate 228 also has inputs through the lines 230 and 152. Under the conditions assumed, there will be an input signal through the line 152 because the AND gate 154 has been enabled as previously described. There will also be an input signal through the line 230, because for the particular runway or group in which the accumulative fault display 126 is connected, there will be an input on the line 138 from the sequencer output line from sequencer 114 corresponding to the runway or assigned group in question. There will also be an input on command line 128 from the control tower because lamps for the runway in question have been turned on be energizing line 128 in the control tower.

Preferably the printers are provided with means for producing an audio signal to notify maintenance personnel whenever the printer starts to print.

The cables between fault detectors and field data acquisition units are preferably two-conductor signal type cables, suitable for direct burial. The cables between the field data acquisition units and the master controller are preferably shielded two-conductor signal cables suitable for direct burial and connected in a series parallel ring circuit as illustrated in FIG. 8.

The invention is not limited to the use of components of particular electrical values. However, in a typical electrical circuit, the circuit values are chosen so that the lamp current is higher than 2.7 amperes and the lamp circuit voltage is higher than 5.6 volts, root-mean-square, to maintain the relays $R_i$ and $R_v$ in contact closed condition. Preferably, for this example, the current relay $R_i$ has contacts which pull in under 2.7 amperes and is capable of standing 6.7 amperes continuously with a sensitivity of 100 milliwatts. For the circuit values assumed in the illustrative installation, the voltage relay $R_v$ is a direct-current type relay with contacts which pull in under 2.2 volts and which is capable of withstanding 30 volts continuously with a sensitivity of 10 milliwatts. The diode 44 preferably has a current reading of 100 milliamperes and a peak reverse voltage of 100 volts. The zener diode 46 for the voltage relay sensitivity assumed preferably has a voltage of 3.4 volts and a current reading of 100 milliamperes. The capacitor 48 in the embodiment illustrated has a capacity of at least 33 micromicrofarads, electrolytic type with a rating of 100 WVDC.

A printer which may be used is a serial entry type with 14 columns, such as a Victor Premier serial entry printer operating on 117 volts, alternating current 60 Hz.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended therefore, to cover all such modifications and variations as fall within the scope of the invention.

What is claimed is:

1. A monitoring system for electrical circuits comprising in combination:

A circuit fault detector for each electrical circuit to be monitored, said fault detector comprising a relay with a series winding for producing an output signal whenever the circuit is open current therein is below a predetermined value, a field data acquisition unit having input lines from each such fault detector and a clock pulse input line, a master controller indicating means sequentially responsive to the master controller, the master controller having an input line from the field data acquisition unit, a clock delivering clock pulses to the field data acquisition unit, the field data acquisition unit including counter means responsive to the master controller clock pulses and data selector means with an input line from each circuit fault detector and counter means for advancing the data selector to cause signals to be supplied to the master controller from a fault detector of a circuit having a fault in the same sequence as indicating means responds to the master controller, the indicating means having means for identifying circuits to be monitored in the same sequence as the fault detector signals are supplied to the data selector, whereby the occurrence of a fault produces a signal identifying the circuit in which the fault has occurred.

2. A monitoring system as in claim 1 wherein the circuits to be monitored are divided into groups and the field data acquisition unit includes counter means with outputs for controlling the data selector, the data selector has control means for actuating the output in sequence according to the sequence of connection of the groups of fault detectors, the fault indicator responsive to the master controller has group identifying means, and the master controller is provided with means for causing the indicator to function in response to a fault detector in sequence according to a group for which the indicator is connected when a fault indication is produced by a fault detector.

3. A monitoring system for airport lighting lamp circuits, comprising in combination:

A circuit fault detector for each lamp circuit to be monitored, a field data acquisition unit having input lines from each such fault detector and a clock-pulse input line, a master controller and indicating means sequentially responsive to the master controller, the master controller having an input line from the field data acquisition unit, a clock delivering clock pulses to the field data acquisition unit, the field data acquisition unit including counter means responsive to the master controller clock pulses and data selector means with an input line from each circuit fault detector and counter means for advancing the data selector to cause signals to be supplied to the master controller from a fault detector of a lamp circuit having a fault in the same sequence as indicating means responsive to the master controller, the indicating means having means for identifying the lamp circuit to be monitored in the same sequence as the fault detector signals are supplied to the data selector, whereby the occurrence of a fault produces a signal identifying the lamp circuit in which the fault has occurred, the lamp circuits to be monitored being divided into groups and the field data acquisition unit including counter means with outputs for controlling the data selector, the data selector having control means for actuating the output in sequence according to the sequence of connection of the groups of fault detectors, the fault indicator responsive to the master controller having group identifying means, and the master controller being provided with means for causing the indicator to function in response to a fault detector in sequence according to the group for which the indicator is connected when a fault indication is produced by fault detector, each fault detector including a relay for producing an output signal when the lamp circuit is open or the current therein is below a predetermined value.

4. A monitoring system as described in claim 3 wherein the fault detector includes a voltage relay which produces an output signal from the fault detector when the lamp voltage falls below a predetermined value.

5. A monitoring system as described in claim 4 wherein the voltage relay has a winding connected across the lamp circuit in series with normally open contacts of the current relay so that the voltage relay cannot be energized when no current is flowing.

6. A monitoring system as described in claim 5 wherein the voltage relay is a direct current relay and the lamp circuit is an alternating current circuit, and a rectifier is connected in series with the winding of the voltage relay.

7. A monitoring system as described in claim 6 wherein a zener diode is connected in series with the rectifier designed for maintenance of a voltage comparable with but below that at which it is desired that the voltage relay shall become de-energized.

8. A monitoring system as described in claim 7 wherein a lamp current regulator is provided having a plurality of current regulation settings, for each of which a control circuit is provided, an adjustable voltage source responsive to such control circuits for producing different voltages depending upon the actuation of the control circuits for producing voltages corresponding to the current settings of the current regulator, a device is provided for producing a voltage corresponding to the actual current flow in the lamp circuit and means are provided for producing a fault signal whenever a predetermined deviation between the two voltages is exceeded.

9. A monitoring system as described in claim 8 wherein a plurality of isolation transformers are provided with primary and secondary windings, each having a secondary winding connected to one of the lamp circuits for energizing the same and a primary winding connected in series with the primary windings of the other isolation transformers in a substantially constant-current supply circuit.

10. A fault detector for the circuit of an electrically energized device comprising in combination:
   A pair of current input terminals,
   a pair of output terminals adapted to be connected to an electrically energized device,
   a first conductor connected between one of the input terminals and one of the output terminals,
   a second conductor connected between the other input terminal and the other output terminal,
   a current relay having contacts and a winding in series with the first conductor,
   a voltage relay having contacts serving as output signal contacts and winding connected across said device in series with said current relay contacts and
   means responsive to the position of the voltage relay contacts to produce a fault signal.

11. A fault detector for the circuit of an electrically energized device comprising in combination:
   a pair of current input terminals,
   a pair of output terminals adapted to be connected to an electrically energized device,
   a first conductor connected between one of the input terminals and one of the output terminals,
   a second conductor connected between the other input terminal and the other output terminal,
   a current relay having contacts and a winding in series with the first conductor, and
   means responsive to the position of the contacts corresponding to failure of a predetermined value of current to flow through the relay winding to produce a fault signal, a second relay being provided having a winding and contacts to which the fault signal means are responsive, the winding of the second relay and the contacts of the first relay being connected in series between the first and second conductors at a point between the winding of the current relay and the output terminals.

12. A detector as described in claim 11 wherein the input terminals are adapted to be connected to a source of alternating current, the current relay is an alternating-current relay, the second relay is a direct-current relay and a rectifier is connected in series with the winding of the direct-current relay.

13. A fault detector as described in claim 12 wherein the second relay is a voltage relay and a zener diode is connected in series with the voltage relay winding and the said rectifier, and the zener diode is designed for a voltage approaching, but below that occuring at the supply terminals when the fault indication is desired.

14. A fault detector as described in claim 13 wherein a capacitor is connected across the winding of the voltage relay.

15. A detector as described in claim 14 wherein the input terminals are the secondary terminals of a current transformer and the output terminals are lamp terminals.

16. A current level fault detector comprising in combination:

a step-type current regulator of the type having a plurality of control circuits each for a different value and with a separate selector conductor arranged to produce a current of a different predetermined value with energization of different control circuits,
a source of indicator voltage, a voltage divider connected thereto with a plurality of connected means, each responsive to one of the current regulator control circuits for supplying different indicator voltages according to which of the control circuits is energized for supplying different voltages to correspond with different levels of current intended to be produced by the current regulator, the current regulator having an output circuit,
means connected in the output circuit for producing a voltage corresponding to the actual current flow in the output circuit of the current regulator, and
means for comparing such voltage with the indicator voltage and means responsive to difference between such voltage and the indicator voltage.

17. A current-level fault detector as described in claim 16 wherein means are provided for producing a fault signal in response to deviation between the voltages of the indicator voltage source and the current responsive voltage exceeding a predetermined value.

18. A current-level fault detector as described in claim 17 wherein a current transformer is connected in series with the output circuit of the current regulator and has a secondary winding serving as means for producing a voltage representative of output current flow, and wherein a differential amplifier is provided having opposing input connections and an output for producing a fault indication, one of the input connections being connected to the said source of indicator voltage and the other input connection being connected to receive the voltage of the secondary winding of the current transformer.

19. A current-level fault detector as described in claim 18 wherein the source of indicator voltage is a direct-current source and a rectifier is interposed between the secondary winding of the current transformer and the second input connection of the differential amplifier.

20. A current-level fault detector as described in claim 19 wherein the rectifier is a full-wave rectifier and a resistor is connected across the secondary winding of the current transformer to limit the voltage thereof to a predetermined value.

21. A monitoring system for electrical circuits comprising in combination:
   a plurality of current-level sensors, each at a location of a device to be monitored,
   a field data acquisition unit having a clock pulse input line,
   a master controller and indicating means sequentially responsive to the master controller, the master controller having an input line from the field data acquisition unit,
   a clock delivering clock pulses to the field data acquisition unit, the field data acquisition unit including counter means responsive to the master controller clock pulses and data selector means with an input line from each sensor and counter means for advancing the data selector to cause signals to be supplied to the master controller from a sensor at a location having a condition to be monitored in the same sequence as indicating means responds to the master controller, the indicating means having means for identifying sensor locations to be monitored in the same sequence as the sensor signals are supplied to the data selector, whereby the occurrence of a condition to be monitored produces a signal identifying the location at which the sensor has responded, each sensor comprising a current relay having a winding and a pair of contacts and a voltage relay having contacts, the position of which serves as a sensor indication, and having a winding connected in series with the current relay contacts across the device to be monitored, the current-relay winding being connected in series with the device to be monitored.

22. A monitoring system as in claim 21 wherein the locations to be monitored are divided into groups and the field data acquisition unit includes counter means with outputs for controlling the data selector, the data selector has control means for actuating the output in sequence according to the sequence of connection of the groups of sensors, the indicator responsive to the master controller has group identifying means, and the master controller is provided with means for causing the indicator to function in response to sensors in sequence according to the group for which the indicator is connected when an indication is produced by a sensor.

* * * * *